United States Patent [19]

Kaufman

[11] 4,352,991
[45] Oct. 5, 1982

[54] PORTABLE LIFE SUPPORT SYSTEM

[76] Inventor: Arthur Kaufman, 100 Delford Ave., Silver Spring, Md. 20904

[21] Appl. No.: 261,727

[22] Filed: May 4, 1981

[51] Int. Cl.³ .......................... B60R 13/00; H02J 7/00
[52] U.S. Cl. .......................................... 307/9; 296/20; 307/150
[58] Field of Search ................... 307/9, 150, 154, 155; 128/419 N, 420 R; 296/20

[56] References Cited

U.S. PATENT DOCUMENTS 3,694,729 9/1972 Jones .................................. 307/150
4,019,772 4/1977 Lee ..................................... 296/20

Primary Examiner—Michael L. Gellner
Attorney, Agent, or Firm—Schwartz, Jeffery, Schwaab, Mack, Blumenthal & Koch

[57] ABSTRACT

A life support system for field use or use on a vehicle has a plurality of separate electrically operable life support units and a support structure supporting same. The support structure carries a DC power supply, and each life support unit is adapted to receive power both from the DC power supply and the vehicle power supply.

14 Claims, 9 Drawing Figures

PORTABLE LIFE SUPPORT SYSTEM

BACKGROUND OF THE INVENTION

The invention is in the field of portable life support systems, and particularly directed to life support systems which are alternatively attachable to a stretcher, a transport vehicle, or adapted for stand-alone use in a hospital.

Advances in medical technology over recent years has led to improved patient care and savings of numerous lives. Medical transport facilities have played a large role in quickly transporting patients to hospital facilities and in providing enroute emergency medical treatment. Emergency transport of the critically ill or injured patient has become an essential element of our health care system. This has led to the advent of the mobile intensive care unit, fixed wing and helicopter transport, and geographically designated shock-trauma centers. The sophistication of emergency medicine has developed rapidly and placed emergency medicine in a specialty field of its own. As part of the growing demands of emergency medicine, there is a need for a portable life support system which may be field-operable as well as operable in transport vehicles such as helicopters, airplanes, and ambulances. Larger aircraft as well as ambulance or other wheeled vehicles generally are spacious enough to be equipped with integrally mounted life support systems such as EKG and defibrillator apparatus, suction devices, oxygen, IV supplies, and the like. It is generally not feasible, however, to bring such life support systems as a total package to areas inaccessible by the transport vehicle. Specific portable units have been developed which permit a selective and often inadequate application of medical technology to patient needs. Moreover, the mechanics of transporting the individual life support systems both within a vehicle and for field use has not been solved in an efficient and economical manner. Often, portable units are simply carried by technical personnel for field use and placed beside the patient and manually carried beside the patient during transport.

SUMMARY OF THE INVENTION

It is an object of the invention to overcome the disadvantages of the prior art by providing a life support system readily attachable to a patient stretcher to provide field use support for a whole range of expected patient conditions.

It is a further object of the invention to provide a life support structure which is both attachable to and readily detachable from a patient stretcher so as to permit transport with the stretcher or alternately for permitting mounting of the life support system to a transport vehicle such as aircraft or ground ambulance.

Another object of the invention is to provide a life support structure adaptable for receiving and supporting a plurality of modular life support units.

A further object of the invention is to provide a life support system which is adaptable for operating electrical life support units. The life support units may alternately be connected to operate on a portable DC power supply transported with the life support unit or a part thereof, or connected to the vehicle power supply or hospital facility power supply. Utilization of a switching unit in combination with a portable DC power supply permits the life support structure to be quite versatile for field, ambulance, air transport or hospital facility use.

This invention enables a shock-trauma center to be brought to the patient and comprises a stretcher with an independent life-support system designed to be used aboard aircraft, boats, ground ambulances, or any other mobile convey. It can be used in emergency rooms, at industrial plants at commercial mines, at construction sites, etc. The invention combines a light-weight collapsible, tubular-constructed stretcher with an electrical or battery powered life-support system, which can be affixed to the stretcher or to the vehicle transporting the patient. This self-contained system is sufficiently versatile to convert a van or an aircraft or a boat into an emergency transport vehicle.

The life-support box may contain a variety of independent units such as defibrillator, electrocardiographic monitor, oxygen valves and gauges, suction apparatuses, IVAC intravenous administration components, etc. Separate drawer storage may be designed for specific patient needs, such as airway maintenance materials, burn therapy equipment, cardiac management packages, etc. Each drawer can be prepackaged to suit the needs of the patient or to anticipate needs based on advanced information. These pre-packaged drawers also have the advantage of ease of replenishment and control of perishable dated drugs.

In industrial settings where sudden medical emergencies may arise, this unit would provide an on-site intensive care module, thus, preserving life-in-transit to a sophisticated medical facility. Specific drawers may be designed for the unique hazards presented by the nature of the factory, mine, plant, etc.

In accordance with the principles of the invention, there is provided a life support system for use in a vehicle having power supply means and for field use comprising (a) a plurality of separate electrically operated life support units, (b) a support structure including means for connecting same to a stretcher for transport with the stretcher, and means for supporting each of the life support units, and (c) a portable DC power supply electrically connected to the life support units for operating same and connected to one of the support structure and stretcher for transporting same. Each of the life support units have input power supply terminal means adapted to receive input power from the portable DC power supply and the vehicle power supply, whereby said life support units may be operated for field use using the portable DC power supply, and operated in vehicles using the vehicle power supply.

Yet another advantage resulting from the invention is the construction of the support frame for receiving modular independent life support units. For example, once personnel are informed of a particular injury associated with the patient at a remote location, the specific life support equipment may easily be slid into the support frame in a vacant bin of the frame. Equipment which will not be necessary can be removed to make room for other needed life support units. The interchangeability of the modular units within bin locations provides an added degree of versatility heretofore not possible. Further, the support rack utilizes a plurality of electrical terminal connectors which are connected directly to the support structure of the rack and powered by a common DC power supply. This enables all of the individual modular life support units to be plug-compatible with the terminal connectors of the support rack and to be of modular sizes to fit within the bins of the support structure. Further versatility is provided by operation of a switching unit used to interconnect the rack power supply terminals either to a portable DC power supply, a vehicle power supply or a hospital AC power line.

BRIEF DESCRIPTION OF THE DRAWINGS

These and other objects of the invention will become clear in reference to the following specification taken in conjunction with the drawings herein.

DETAILED DESCRIPTION OF THE PREFERRED EMBODIMENT

Figure 1:
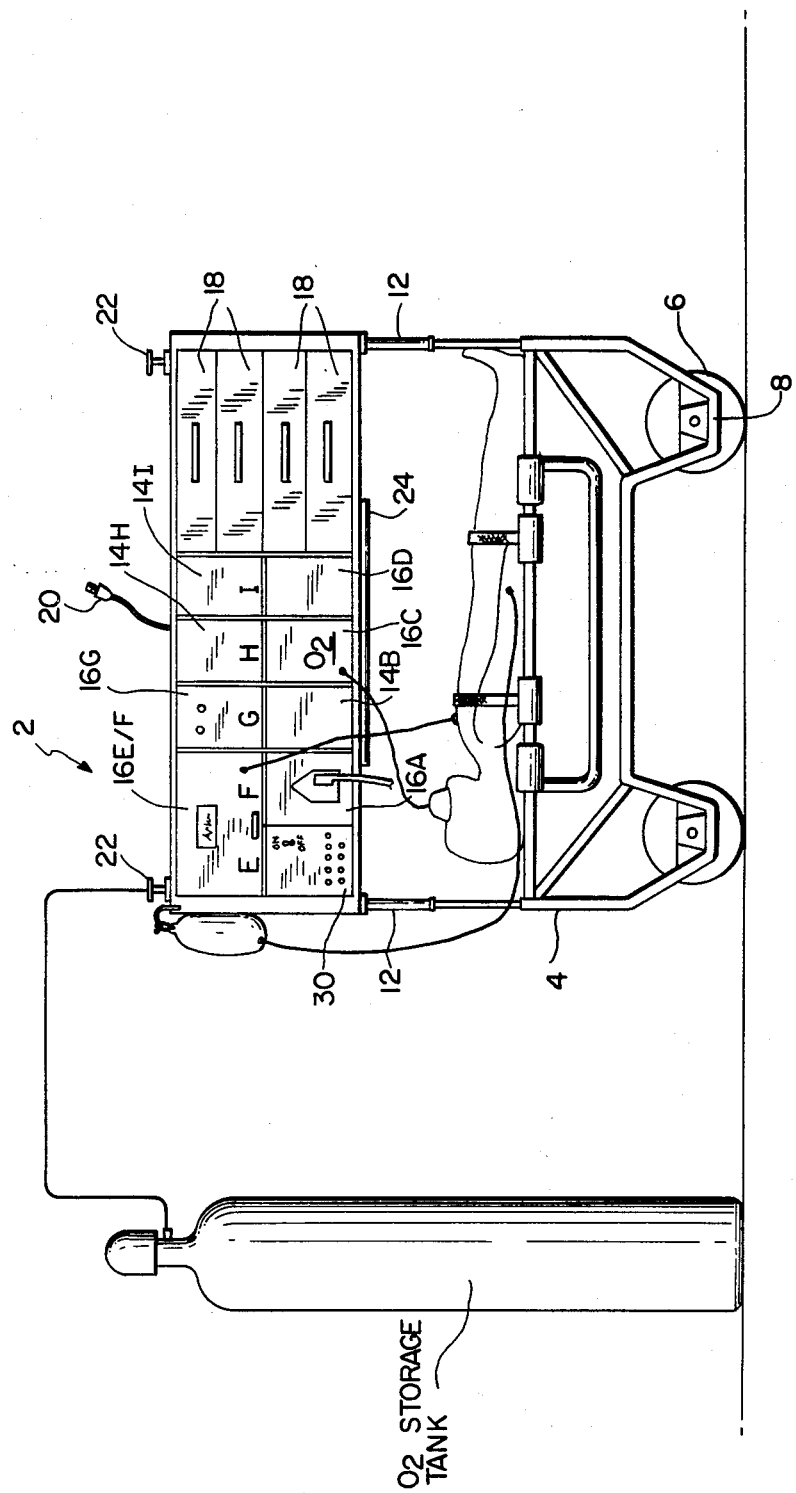
FIG. 1 shows an overall front view of the life support system connected to a patient stretcher.

As illustrated in FIG. 1, a life support system 2 is shown connected to a stretcher 4 on which a patient is supported. The stretcher 4 may be of conventional construction and is preferably made of tubular light weight material such as graphite. The stretcher may be made with slip wheels so that the base of the stretcher 8 may be secured to an aircraft superstructure to secure same for transport.

A medical supply box 10 is shown supported over the stretcher 4 by means of a plurality of telescoping support poles 12. Generally, four such support poles are provided, one secured to each corner of the stretcher. The medical supply box 10 contains a plurality of compartments or bins 14 (see FIG. 2) which house a plurality of individual life support units 16. Units 16 may be of modular construction so that one unit may be interchanged for another unit, each unit being of equal size and overall dimensions or integral multiples of a standard size unit. Each life support unit is operative to provide a specific life support function or is utilized to house specific or general medical supplies. Drawers 18 may also be provided for storing medical supplies. For example, one drawer may be utilized for airway maintenance, a second drawer for burns therapy, a third drawer for cardiac drugs, etc.

Also illustrated in FIG. 1 is a DC current terminal connector 20 utilized for interconnection with the electrical assembly of the transport vehicle such as aircraft or land ambulance. Further, mounts 22 are provided for securing the supply box 10 to overhead mounts of an aircraft so as to secure same above the patient during transport. In this case, the telescoping poles 12 may be disengaged from the stretcher 4 to permit additional access area between the patient and the supply box 10. Alternately, the support poles 12 may be elongated by telescoping same so that they maintain connection to stretcher 4 while the supply box 10 is suspended to the aircraft thus providing additional support for the supply box 10. The supply box 10 may also include a lighting fixture 24 on the bottom thereof to illuminate the patient supported by the stretcher. For field use, the supply box 10 has at least one of its compartments 14 housing a portable DC battery which may be connected to the various life support unit 16 which need electrical power.

Figure 2:
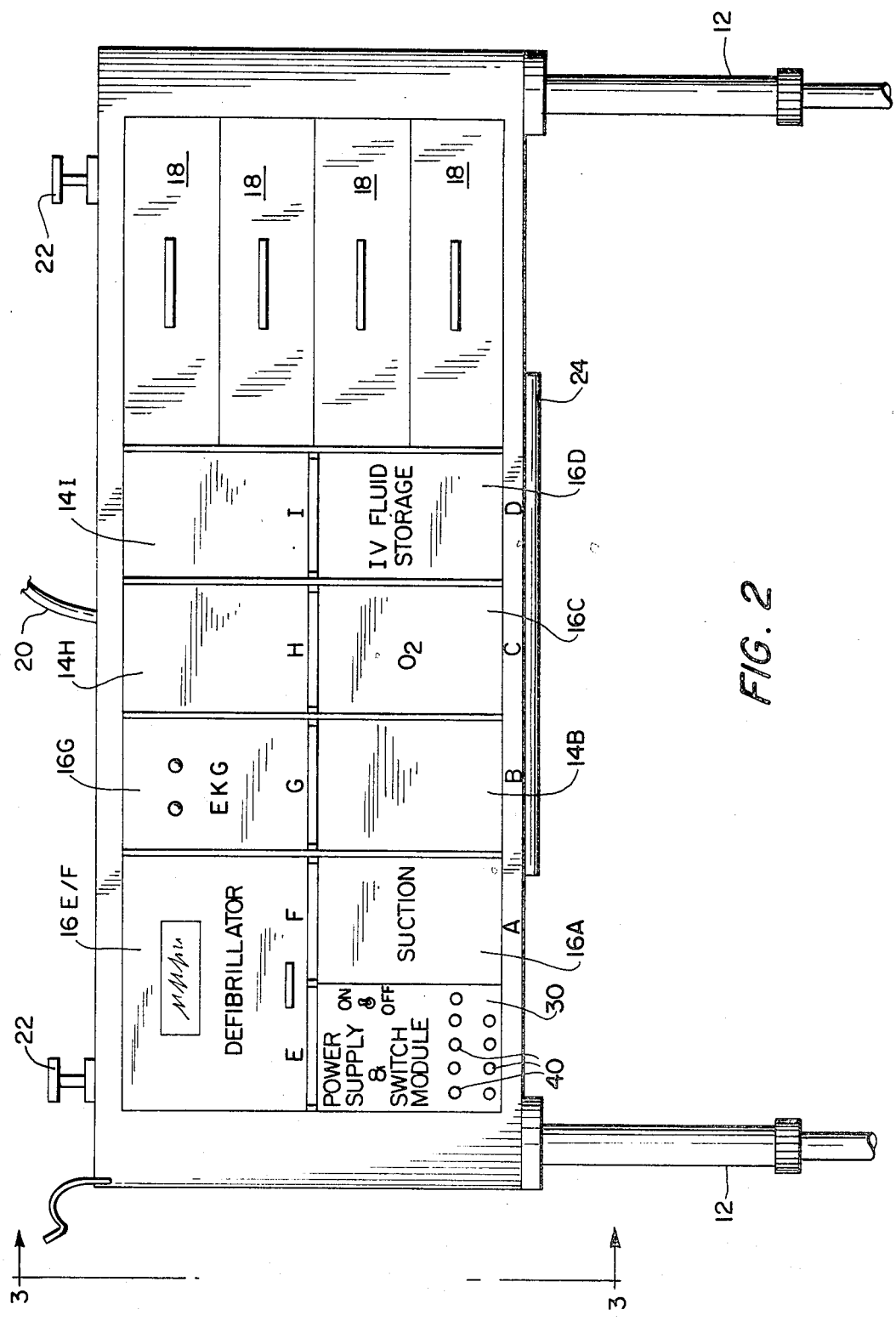
FIG. 2 shows a detailed view of the life support structure illustrating various modules which may be utilized in the bin structure of the life support frame.
Figure 3:
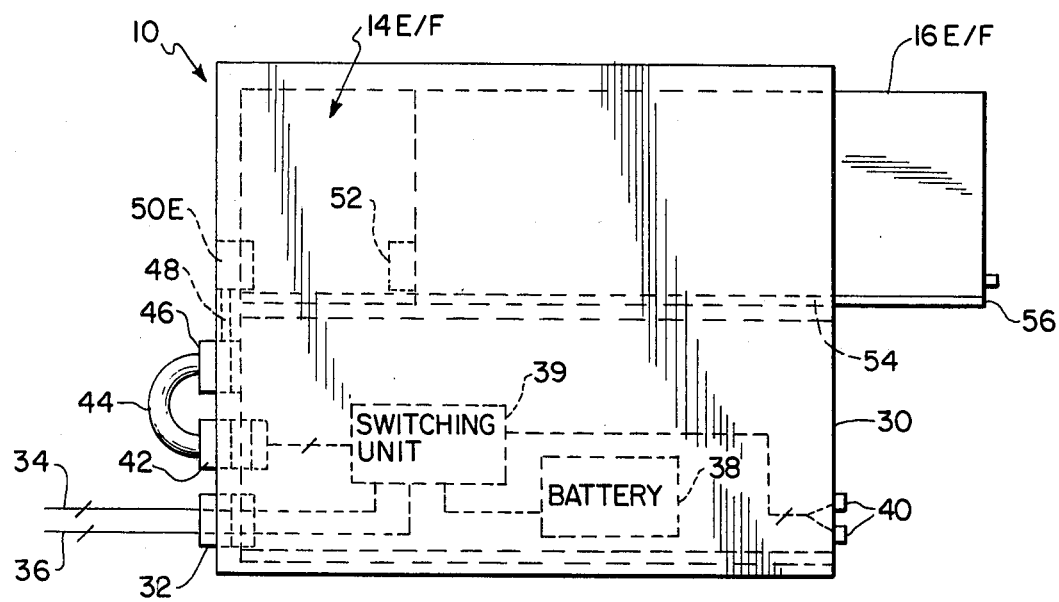
FIG. 3 illustrates a side view of the bin structure as shown along line 3—3 of FIG. 2.
Figure 4:
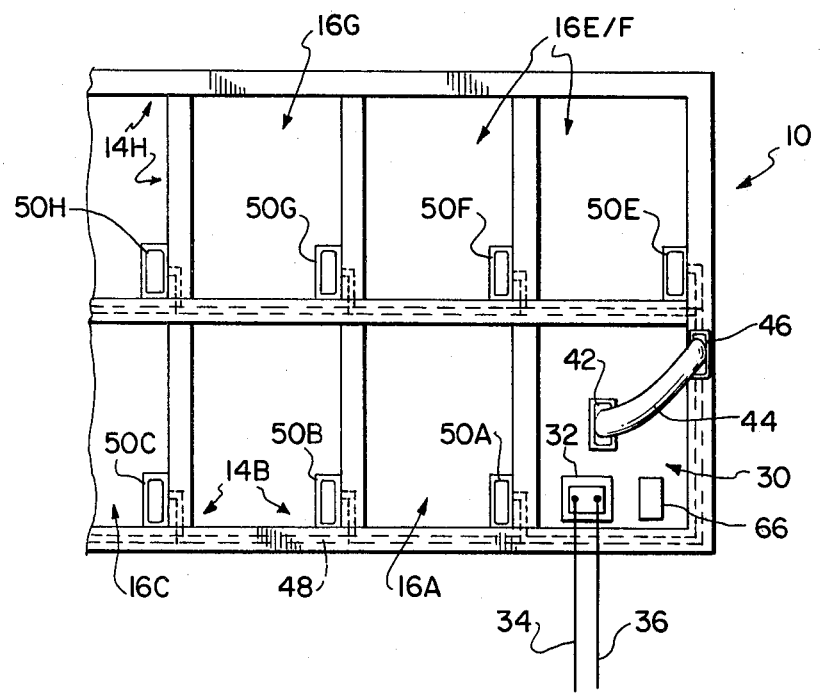
FIG. 4 shows a partial back view of the support structure.

The construction of the supply box 10 is better illustrated in FIGS. 2, 3, and 4. In the preferred embodiment of the invention, as illustrated in FIGS. 2–4, each of the life support units 16 is of modular construction and of such a size as to fit to either one, two, three, or any integral number of bins 5. In FIG. 2, it may be seen that a plurality of compartments or bins 14 are provided, namely, bins 14A–14I. Bins 14A, 14C, 14D, 14E/F and 14G are occupied by life support units identified as 16A, 16C, 16D, 16E/F and 16G, respectively. Bins 14B, 14H and 14I are shown unoccupied by way of example. In fully utilizing the supply box 10, a life support unit 16A would be utilized within the bin 14A, life support system 16B would be utilized within bin 14B, etc. It is noted that the defibrillator shown as life support unit 16E/F occupies two bins, namely, bins 14E and 14F. The medical supply box 10 is constructed such that the defibrillator could be placed in any available adjacent two-bin area and likewise, any of the single bin units could be interchanged with one another or could be placed in any of the empty bins.

The life support box 10 also contains a power supply and switch module 30 which is utilized to store a DC power source, such as a battery, as well as to provide switching circuits for interconnecting the battery power to any of the bins 14 and thus to any of the life support units 16. A switching unit may also be utilized to disconnect the battery from any of such units and to connect same instead to an outside DC power source such as a vehicle power source (land, sea or air transport vehicle). Further, the outside power source could, in fact, be a hospital facility AC line. Typically, the individual life support units are operable in either an AC or DC input power mode.

As best illustrated in FIGS. 3 and 4, the power supply switch module 30 receives either AC or DC input at its input terminal 32. The AC input may be provided by a hospital AC supply line 34, and the DC input may be provided on line 36 from an outside DC power source such as a vehicle power suppply. A battery 38 is provided within the power supply and switch module 30, and it is this battery 38 which supplies the necessary power when the external power supplies are not available or otherwise not connected. The switching unit 39 within the power supply and switch module 30 is selected by means of a plurality of front panel switches 40, wherein one switch is provided for each bin 14. By utilizing the switches 40, power may be selected between either the AC line 34, the DC line 36 or the internal DC power supply 38 to provide power on an output terminal 42. Power from the terminal 42 is fed by a cable 44 to the supply box input terminal 46 where it is distributed by means of a bus 48 to terminals 50A–50I. The terminals 50A–50I are positioned to plug into corresponding terminals projecting from each life support unit 16. One such terminal is shown in as element 52 in the life support unit 16E/F which is partially positioned within its receiving bin 14E/F. It may also be seen from the life support units 16E/F that means are provided to facilitate the sliding in and removal of various life support units from their corresponding bins. For this purpose, grooves 54 may be provided on the bottom supporting surface of the bins 14 which match up with corresponding tracks 56 on each of the modular units 16. The grooves 54 and tracks 56 serve to align the various life support units 16 within their respective compartments 14 so that the terminals 52 of each support unit 14 are properly aligned with the corresponding receiving terminals 50.

The particular advantage in utilizing the embodiment of FIG. 3 is to interconnect all of the life support units 16 to a power supply by means of connecting the single external power source supply to the power supply and switching module 30. It is thus typically not necessary to connect each and every module to separate lines in the transport vehicle. However, such an arrangement is still possible as described below in relation to FIG. 9.

Figures 5, 6:
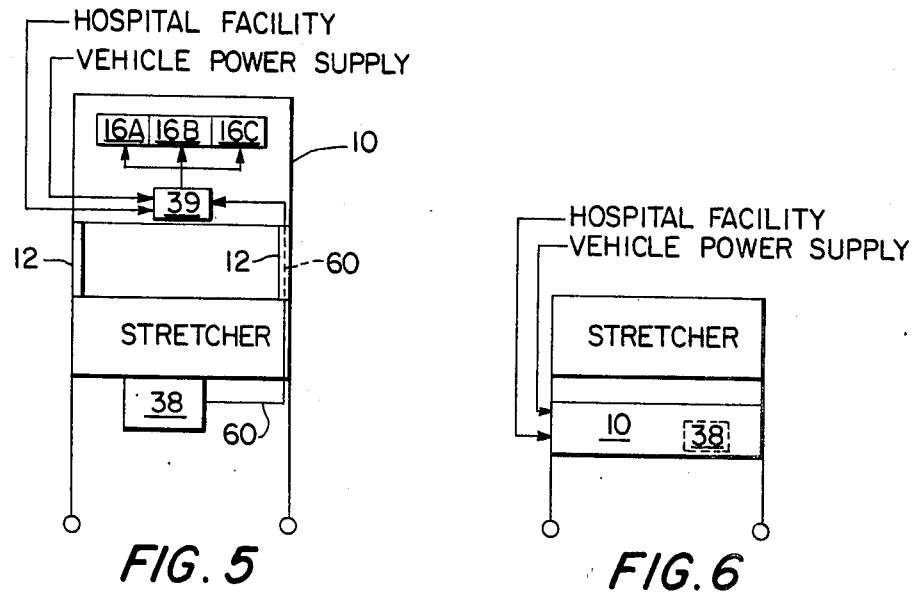
FIG. 5 shows a block diagram of one embodiment of the invention.
FIG. 6 shows a block diagram of another embodiment of the invention.

An alternate arrangement of the invention is illustrated in FIG. 5 wherein the portable DC battery 38 is not incorporated within the power supply and switching module 30 but is rather connected to the stretcher itself and supported underneath the patient. In such an arrangement, the supply box 10 would comprise the electrically operated life support unit 16 interconnected to the switch unit 39. Power from the portable battery 38 is fed to the switch unit 39 by means of a line 60 passing within the interior of the telescoping support poles 12 which are typically hollow. The line 60 connects to input terminal 66 of the module 30.

In yet an alternate arrangement of the invention as shown in FIG. 6, the entire medical supply box 10 may be supported underneath the stretcher 38. In this embodiment, the battery 38 would typically be incorporated within the supply box 10.

Figure 7:
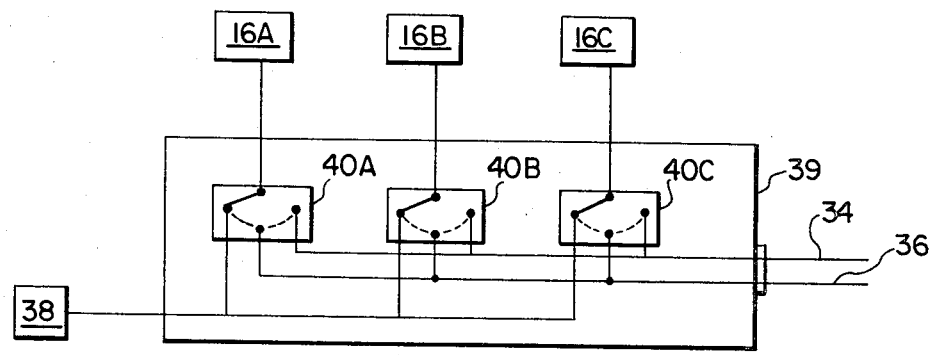
FIG. 7 shows a schematic block diagram of the switching unit in accordance with one embodiment of the invention.

One version of the switch unit 39 is illustrated in FIG. 7. In this embodiment of the invention, the switching unit 39 is operable for individually connecting any of the units 16 to either the hospital facility power source along line 34, the vehicle power source along line 36 or the portable DC battery 38. For this purpose, a plurality of switches 40 are shown. For purposes of illustration only, three life support units 16A-16C have been shown with corresponding switches 40A-40C. Each switch unit 40A-40C is a triple position switch so it is possible to have unit 16A connected to the DC portable power source 38 while units 16B and 16C are each connected to the vehicle power supply provided along line 36. In reference to FIG. 2, a separate switch 40 is provided for each of the compartments 14.

Figures 8, 9:
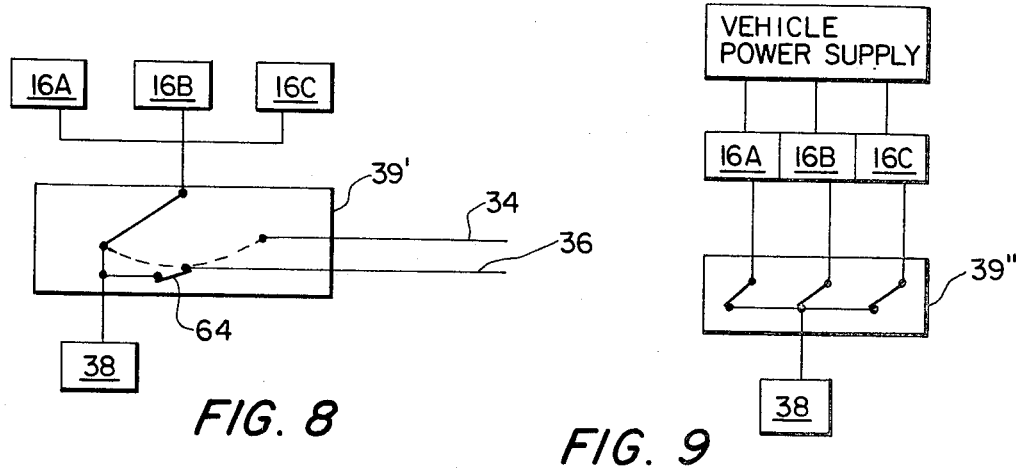
FIG. 8 shows a schematic block diagram of the switching unit in accordance with another embodiment of the invention.
FIG. 9 illustrates yet a third embodiment for providing electrical power to the individual modular life support units.

An alternate arrangement of the switch unit is indicated at 39 is shown in FIG. 8. In this embodiment of the invention, all of the life support units 16 are connected to either (1) the portable battery 38, (2) the vehicle power supply or (3) the hospital facility power supply. A switch 64 is also provided to be used for recharging battery 38 from the vehicle DC power supply.

In accordance with yet another embodiment of the invention, the switch unit 39 is provided for interconnecting the battery 38 individually to any one of the units 16A-16C. In such an arrangement, the vehicle power supply may be manually attached for connecting power to any of the units 16A-16C whereas the switches forming part of the switch unit 39 may be utilized to connect the vehicle battery to any life support unit.

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

What is claimed is:

1. A life support system for field use and for use in a vehicle having power supply means, said life support system comprising:
   (a) a plurality of separate electrically operable life support units,
   (b) a support structure including means for connecting same to a stretcher for transport with said stretcher and means for supporting each of said life support units,
   (c) a portable DC power supply electrically connectable to said life support units for operating same and connected to one of said support structure and stretcher for transporting same, and
   (d) each of said life support units having input power supply terminal means adapted to receive input power from said portable DC power supply and said vehicle power supply,
   whereby said life support units may be operated for field use using said portable DC power supply, and operable in said vehicle using said vehicle power supply.

2. A life support system as recited in claim 1, wherein each of said life support units further includes additional input power terminal means adapted to receive input power from a hospital facility having AC power supply means.

3. A life support system as recited in claim 2 further comprising power switch means interconnected in circuit between said input power supply terminal means and each of said life support units for selectively connecting said life support units to said vehicle power supply means and said portable DC power supply means.

4. A life support system as recited in claim 3, wherein said switching means is operable for simultaneously interconnecting each of said life support units selectively to one of said vehicle power supply means and said portable DC power supply means.

5. A life support system as recited in claim 2 further comprising power switch means interconnected in circuit between said input power supply means and each of said life support units for selectively connecting said life support units to said vehicle power supply means, said portable DC power supply means and said hospital facility power supply means.

6. A life support system as recited in claim 5, wherein said switching means is operable for simultaneously interconnecting each of said life support units selectively to one of said vehicle power supply means, said portable DC power supply means and said hospital facility supply means.

7. A life support system as recited in claim 1, wherein said life support structure includes a plurality of telescoping support legs, each leg connectable to said stretcher for adjustable supporting said support structure above said stretcher.

8. A life support system as recited in claim 1, wherein said support structure is generally rectangular having an open front portion for slidably receiving and supporting said life support units.

9. A life support system as recited in claim 8, wherein said life support structure includes a plurality of compartments for storing medical supplies.

10. A life support system as recited in claim 8, wherein said support structure includes a plurality of bins having exposed front portions, each bin adapted for receiving any one of said life support units.

11. A life support system as recited in claim 10, wherein said life support structure includes terminal means associated with each bin for interconnection with said input power supply terminal means of said life support units, said terminal means of said bins connected to receive power from said portable DC power supply.

12. A life support system as recited in claim 8 further including a switching unit supported by said support structure and having means for receiving power from said vehicle power supply, said support structure including terminal means associated with each bin for interconnection with said input power supply terminal means of said life support units, said terminal means of said bins connected to said switching unit for interconnecting said vehicle power supply to said bins.

13. A life support system as recited in claim 12, wherein said switching unit is also connected to receive power from said portable DC power source and includes means for selectively interconnecting said terminal means associated with said bins with said portable DC power supply and said vehicle power supply.

14. A life support system as recited in claim 12, wherein each of said life support units further includes additional input power terminal means adapted to receive input power from a hospital facility having facility power supply means and includes means for selectively interconnecting said terminal means associated with said bins with said portable DC power supply, said vehicle power supply and said hospital facility power supply.

* * * * *